United States Patent
Mikalsen et al.

(10) Patent No.: US 7,934,223 B2
(45) Date of Patent: Apr. 26, 2011

(54) CONTEXT-SENSITIVE MIDDLEWARE SERVICE INJECTION

(75) Inventors: Thomas A. Mikalsen, Cold Spring, NY (US); Eric Wohlstadter, Lafayette, CA (US); Stefan Tai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/623,059

(22) Filed: Jan. 13, 2007

(65) Prior Publication Data

US 2008/0172675 A1    Jul. 17, 2008

(51) Int. Cl.
*G06F 3/00* (2006.01)
(52) U.S. Cl. .................................. 719/328; 719/330
(58) Field of Classification Search .................. 719/330, 719/328
See application file for complete search history.

(56) References Cited

U.S. PATENT DOCUMENTS

| | | | |
|---|---|---|---|
| 6,604,143 B1 * | 8/2003 | Nagar et al. | 709/229 |
| 7,000,238 B2 * | 2/2006 | Nadler et al. | 719/330 |
| 7,246,360 B2 * | 7/2007 | De Bonet | 719/328 |
| 2002/0061741 A1 | 5/2002 | Leung et al. | |
| 2002/0129088 A1 | 9/2002 | Zhou et al. | |
| 2004/0117453 A1 | 6/2004 | Cheng et al. | |
| 2004/0122720 A1 | 6/2004 | Mikalsen et al. | |
| 2005/0135264 A1 | 6/2005 | Popoff et al. | |
| 2005/0154730 A1 | 7/2005 | Millet et al. | |

* cited by examiner

*Primary Examiner* — Lechi Truong
(74) *Attorney, Agent, or Firm* — Ido Tuchman; William J. Stock

(57) ABSTRACT

A system, method and computer program product for context-sensitive middleware service injection. A technique is described to apply desired middleware functionality to granular units of functionality in response to extra-functional requirements and context information. Context may include without limitation types of process activities, phases of execution of process activities, identities of interaction partners, system architectures and the status of a given interaction. A further technique is described to dynamically analyze processes to select middleware functionality for compatibility with declared extra-functional requirements and detected context information.

9 Claims, 5 Drawing Sheets

CONTEXT-SENSITIVE MIDDLEWARE SERVICE INJECTION

BACKGROUND OF THE INVENTION

The present invention relates generally to middleware services. More specifically, the invention relates to a method and system for transforming a process through middleware service injection in a selective manner dependent upon context information related to the process.

A key goal of distributed computing networks, such as the Internet, is to allow systems at different locations within the network to interact with each other. Such interaction is generally accomplished through message exchanges. An exchanged message is often a request or a response. A response is typically a reaction to a request.

Systems that include a distributed computing network may be heterogeneous. For example, such systems may include clients, service providers, or both. The systems may embody differing architectures, operating systems and behavior. Furthermore, the systems may impose differing extra-functional requirements upon interaction.

Extra-functional requirements frequently relate to security. For example, a system may require that the sender of a message be authenticated and may further require a specific method of authentication. A system may also require that a message be encrypted and may further require a specific method and/or level of encryption.

Extra-functional requirements also frequently relate to reliability. Common reliability requirements include guaranteed message delivery and transactionality. Guaranteed message delivery means ensuring the delivery of a message and detecting any failure to deliver the message. Transactionality means the encapsulation of multiple requests in a transaction that is atomic: either all requests in the transaction are executed, or none of the requests are executed.

Often times, two interaction partners will impose differing extra-functional requirements. Middleware services are commonly used in the art to comply with the extra-functional requirements on both sides, allowing the differing partners to interact.

Middleware services may achieve this goal by manipulating requests and/or responses so as to conform to extra-functional requirements. For example, a middleware service may encrypt and decrypt messages using an encryption protocol that meets the encryption requirements of the systems exchanging messages. Middleware services may also implement distributed protocols that meet given extra-functional requirements. For example, a middleware service may implement an authentication protocol that meets the security requirement of a certain system. A middleware service may also implement a guaranteed message delivery protocol or a transaction protocol. Middleware services may also provide interfaces for use by applications.

In middleware systems known in the art, extra-functional requirements are generally preconfigured using Application Programmer Interfaces (API's). This approach necessitates that the requirements are known at the time of system design. This in turn necessitates foreknowledge of the specific systems involved in interaction, as each system may impose differing extra-functional requirements. Frequently, however, this knowledge is not available at the time of system design.

Middleware functionality is commonly integrated into a message exchange using a technological device called an interceptor. An interceptor is applied within the message flow at one or more points. These points may be on either or both of the systems engaged in the message exchange. At each such point, the interceptor may manipulate the message flow and/or provide functionality.

Interceptor-based methods of implementing middleware functionality may apply to sending requests and receiving responses generally. Unfortunately, interceptor-based methods known in the art do not generally facilitate granular application of middleware functionality based upon message context. For example, such systems typically do not facilitate selectively applying middleware functionality for messages related to particular types of operations.

BRIEF SUMMARY OF THE INVENTION

The present invention addresses the above-mentioned limitations of the prior art by introducing a method and system for context-sensitive middleware service injection. One notable feature of the method and system is an improved technique for applying desired middleware functionality to granular units of functionality in response to extra-functional requirements and context information. Another notable feature of the method and system is an improved technique for dynamically analyzing processes to select middleware functionality for compatibility with declared extra-functional requirements and detected context information.

Thus, one exemplary aspect of the present invention is a method for context-sensitive middleware service injection. In this method, middleware service injection plug-ins matching a context of one or more process activities are selected. Context may include without limitation extra-functional requirements, types of process activities, phases of execution of process activities, identities of interaction partners, system architectures and the status of a given interaction. An activity interceptor matching the context of the process activity is associated with each of the one or more process activities. Furthermore, each of the one or more process activities is transformed by the activity interceptor by associating with each process activity the middleware service injection plug-in matching the context, the plug-in effecting a desired functionality.

Another exemplary aspect of the present invention is a system for context-sensitive middleware service injection. In this system, a middleware injection engine is configured to select middleware service injection plug-ins matching a context of one or more process activities. Context may include without limitation extra-functional requirements, types of process activities, phases of execution of process activities, identities of interaction partners, system architectures and the status of a given interaction. One or more middleware service injection plug-ins are each configured to effect a desired functionality given one or more possible contexts. One or more activity interceptors are each configured to transform a process activity by associating with that activity a middleware service injection plug-in matching the context and the desired functionality.

Yet a further exemplary aspect of the present invention is a computer program product comprising a computer-readable medium embodying computer program code. The computer program code includes computer executable instructions for selecting middleware service injection plug-ins matching a context of one or more process activities; associating with each of the one or more process activities an activity interceptor matching the context of the process activity; and transforming each of the one or more process activities by the activity interceptor by associating with each process activity the middleware service injection plug-in matching the context, the plug-in effecting a desired functionality.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
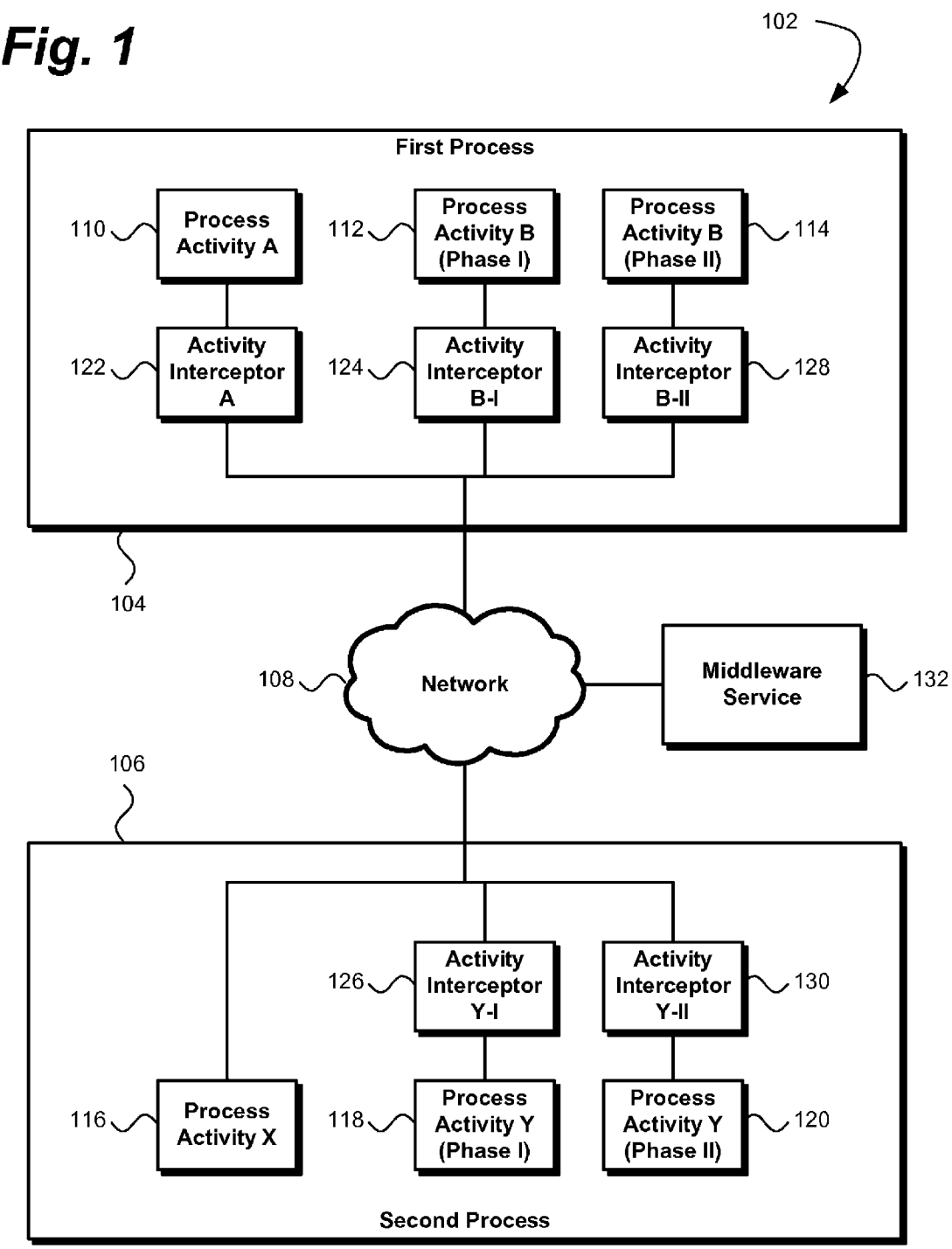
FIG. 1 illustrates how an exemplary series of interactions between process activities is facilitated by context-sensitive middleware service injection.

The present invention will be described with reference to embodiments of the invention. The embodiments below do not limit the present invention described in claims and all the combinations of components described in the embodiments are not necessary for means to solve the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates how an exemplary series of interactions between process activities is facilitated by context-sensitive middleware service injection.

The system 102 includes a first process 104 and a second process 106. The first process 104 and the second process 106 are interaction partners. A process may be implemented in hardware and/or software. Specifically, processes may consist of integrated circuits, compiled computer program products, interpreted computer program products, and subsets of computer program products such as processes, threads and subroutines. Processes may be defined to accomplish a wide variety of goals. Likewise, the interaction between the processes may occur for a wide variety of reasons. It is noted that while two processes suffice to demonstrate aspects of the present invention, the number of processes which may interact using the present invention is not limited to two and may indeed be very large. It is further noted that the processes engaged in interaction may differ in hardware characteristics such as architectures of the underlying computing systems and/or software characteristics such as operating systems and programming languages.

In the exemplary system, the first process 104 and the second process 106 are housed at separate physical locations and connected via a network 108. The network may be any of various types known in the art, including by example and without limitation TCP/IP, Wi-Fi®, Bluetooth® piconets, token ring and microwave. Wi-Fi is a registered trademark of the Wi-Fi Alliance, Austin, Tex., United States. Bluetooth is a registered trademark of Bluetooth SIG, Inc., Bellevue, Wash., United States. It is noted, however, that a network is not essential to the present invention. It is contemplated that the present invention may beneficially facilitate the interaction of processes executing within the same computing system but having differing extra-functional requirements.

The first process 104 incorporates one or more process activities 110, 112, 114. The second process incorporates one or more process activities 116, 118, 120. A process activity is a subset of a process which undertakes an action or a sequence of actions. As with processes, process activities may be implemented in hardware and/or software. Specifically, process activities may consist of integrated circuits, compiled computer program products, interpreted computer program products, and subsets of computer program products such as processes, threads and subroutines. Process activities may be defined to accomplish a wide variety of goals. A given process activity may be instantiated zero or more times at any given point in time. It is noted that the term "process activity" may be used hereinafter to refer to one of several instances of the same process activity type.

In the exemplary system, an instance of process activity A 110 within the first process 104 interacts with an instance of process activity X 116 within the second process 106. A first instance of process activity B 112 within the first process interacts with a first instance of process activity Y 118 within the second process. These process activities are engaged in Phase I of a multi-phase interaction. A second instance of process activity B 114 within the first process interacts with a second instance of process activity Y 120 within the second process 106. These latter process activities are engaged in Phase II of the multi-phase interaction. It is noted that more than, or fewer than, three pairs of interaction partners may exist in a system embodying the present invention. It is further noted that process activities engaged in interaction need not have a one-to-one correspondence. For example, a server process activity may interact with multiple client process activities.

A process and/or a process activity may impose one or more extra-functional requirements on an interaction. Extra-functional requirements may be inherent in the architecture and design of the processes, and may include interoperability requirements. For example, an extra-functional requirement may state that any messages exchanged shall be encoded in the native character set of the architecture on which a process executes. Extra-functional requirements may also be a matter of policy. For example, an extra-functional requirement may state that messages must be encrypted with a strength of at least 128 bits. Furthermore, the extra-functional requirements may vary depending on the context of the interaction. The relevant context elements may include without limitation the types of process activities, the phases of execution of process activities, the identities of interaction partners, the system architectures and the status of a given interaction. It is noted that either process activity or both process activities involved in an interaction may express requirements. Finally, it is noted that the extra-functional requirements of a process activity may change over time.

In the exemplary system, process activity A 110 specifies an extra-functional requirement that messages be encoded in UTF-8. UTF-8 is an encoding format for Unicode®, a character set incorporating the characters used by a wide variety of human languages. Unicode is a trademark of Unicode, Inc., Mountain View, Calif., United States. Process activity X 116, by contrast, specifies an extra-functional requirement that messages be encoded in EBCDIC (Extended Binary Coded Decimal Interchange Code). EBCDIC is generally used by mainframe computers and other legacy systems.

To overcome this barrier, an activity interceptor 122 facilitates communication between the two disparate process activities. An activity interceptor is a technological device that interpolates itself within the message flow, causing the exchanged data to be modified to conform to extra-functional requirements. An activity interceptor may also cause protocols to be implemented and otherwise may cause additional functionality to be provided to the process activities. Additionally, an activity interceptor may cause meta-information to be appended to messages. Meta-information may provide context information useful for understanding and/or processing the original message. Finally, an activity interceptor may cause an interface to be provided for the use of the process activity. An activity interceptor may be implemented in hardware and/or software. Specifically, activity interceptors may consist of integrated circuits, compiled computer program products, interpreted computer program products, and subsets of computer program products such as processes, threads and subroutines.

In the exemplary system, activity interceptor A 122 causes messages sent by process activity A 110 to be converted from UTF-8 to EBCDIC so they are acceptable to process activity X 116. Activity interceptor A also causes messages received from process activity X to be converted from EBCDIC to UTF-8 so they are acceptable to process activity A. No activity interceptor is applied to process activity X, as it receives messages and can send messages in its preferred encoding due to the effects of activity interceptor A. As this example demonstrates, an activity interceptor may be applied to only one side of an interaction to achieve desired middleware functionality.

The extra-functional requirements of process activities B and Y depend on the phase of interaction. Phase I involves authentication and negotiation. Therefore, during Phase I, both process activity B 112 and process activity Y 118 specify an extra-functional requirement that a specific encryption algorithm be applied to exchanged messages. Thus, activity interceptor B-I 124 interpolates itself within the message flow at the first computing system. It causes sent messages to be encrypted and received messages to be decrypted according to the specified encryption algorithm. Likewise, activity interceptor Y-I 126 interpolates itself within the message flow at the second computing system. It too causes sent messages to be encrypted and received messages to be decrypted according to the specified encryption algorithm. As this example demonstrates, activity interceptors may be applied to both ends of an interaction to achieve desired middleware functionality.

Phase II of process activities B and Y involves the exchange of data. Some of the data operations must be performed within transactions due to business requirements. A transaction is a technique used in the art to ensure that either each member of a set of actions is successfully completed or that none of the actions in the set are performed. During Phase II, both process activity B 114 and process activity Y 120 specify an extra-functional requirement that transaction functionality must be available. Thus, activity interceptor B-II 128 interpolates itself within the message flow at the first computing system. It causes the transaction protocol to be implemented on its end of the interaction. Likewise, activity interceptor Y-II 130 interpolates itself within the message flow at the second computing system and causes the transaction protocol to be implemented on its end of the interaction. As this example demonstrates, activity interceptors may be applied to provide functionality without modifying the content of the message itself.

It is emphasized that each activity interceptor may be specific to a middleware service type. Thus, in this example, different activity interceptors are applied to achieve character encoding, encryption and transactionality. Moreover, different activity interceptors may be provided for different process activities. In this example, the activity interceptors applying to process activity A are different from those applying to process activity B. It is noted that it would be possible to use different activity interceptors for process activities A and B even if applying the same middleware service. Furthermore, it is emphasized that activity interceptors B-I 126 and B-II 130 are different even though both are applied to process activity B. This occurs because different activity interceptors were applied based on differing context, namely the phase of operation.

The actual middleware functionality may be provided by a middleware service 132. The middleware service may be located at a location separate from the computing systems engaged in interaction. In this case, the middleware service may be accessed via a network 108. It is noted that multiple middleware services may exist, and different activity interceptors may contact different middleware services depending on the precise middleware functionality desired. It is further noted that a single middleware service may provide multiple types of middleware functionality.

Figure 2:
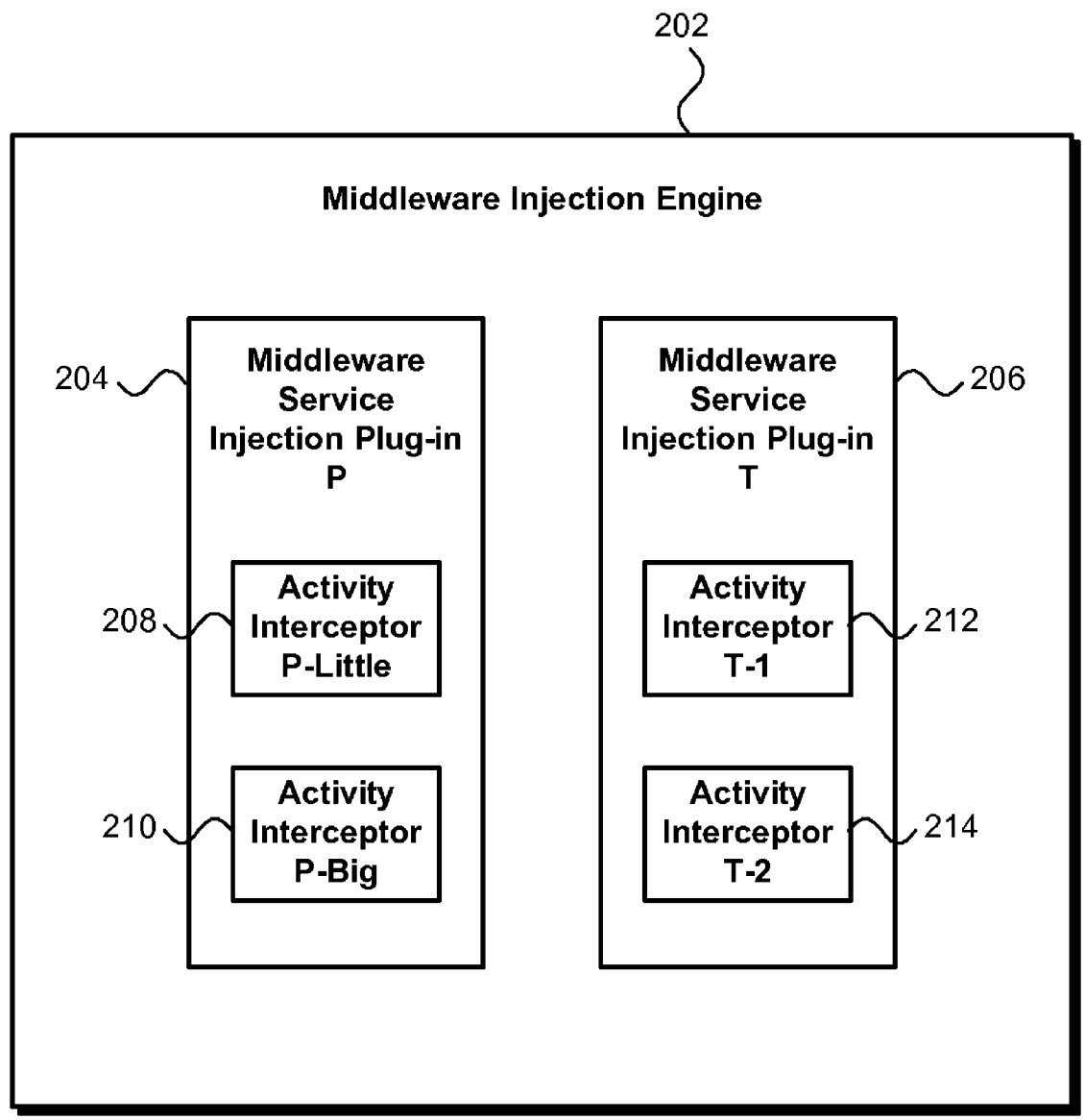
FIG. 2 shows an exemplary system for context-sensitive middleware service injection, the system embodying the present invention.

FIG. 2 shows an exemplary system for context-sensitive middleware service injection, the system embodying an aspect of the present invention.

A middleware injection engine 202 may transform a process by injecting middleware functionality into the process. As discussed above, a process is composed of one or more process activities, each of which may be modified separately. The middleware injection engine may select, from a wide variety of available middleware functionality, specific units of functionality that modify the process. The middleware injection engine may understand the extra-functional requirements of processes and/or process activities and may select middleware functionality meeting these requirements. Furthermore, the middleware injection engine may be aware of the context of processes and/or process activities and may select middleware functionality appropriate to the context. Context may include without limitation types of process activities, phases of execution of process activities, identities of interaction partners, system architectures and the status of a given interaction.

The middleware injection engine 202 may include one or more middleware service injection plug-ins 204, 206. A middleware service injection plug-in is configured to effect a desired middleware functionality given one or more contexts by creating and attaching activity interceptors to process activities. The plug-in is process-independent; the interceptor is an artifact of the plug-in that is attached to a specific process activity. A middleware service injection plug-in may be implemented in hardware and/or software. Specifically, middleware service injection plug-ins may consist of integrated circuits, compiled computer program products, interpreted computer program products, and subsets of computer program products such as processes, threads and subroutines. The middleware injection engine is configured to select middleware injection plug-ins matching the extra-functional requirements and/or the context of the process and/or its process activities. The middleware service injection plug-ins matching these criteria provide the desired middleware functionality.

The middleware service injection plug-in may itself incorporate the logic of the middleware functionality and may itself cause this logic to be applied to the message flow. The middleware service injection plug-in may also serve as a proxy for middleware functionality located outside of itself. In this case, the plug-in may invoke the middleware functionality at the remote location. It may also provide an interface to the remote functionality. For example, the plug-in may transmit all or a subset of the local message flow as input to the remote functionality. It may then receive the output of the remote functionality and may cause the output to be applied to the local message flow.

In an embodiment of the present invention, the remote middleware functionality for which the middleware service injection plug-in is a proxy is implemented as a web service. The web service may be defined using the Web Services Definition Language (WSDL), an XML-based grammar used to specify and advertise web services. In a further embodiment of the present invention, central repositories are configured to catalog types of middleware functionality along with the location at which each may be invoked. Location information may include the network address of a middleware service providing the middleware functionality and may further include additional information specifying a unit of functionality within the middleware service. Each type of middleware functionality thus catalogued may be assigned one or more unique identifiers. A unique identifier may specify an extra-functional requirement that is met by the middleware functionality. Searching features may be provided so that a system embodying the present invention may query for desired middleware functionality. The search features may receive as a query zero or more unique identifiers of desired middleware functionality and zero or more elements of context information. In response to the query, the search may transmit the location of zero or more units of matching middleware functionality.

Each middleware service injection plug-in 204, 206 includes one or more activity interceptors 208, 210, 212, 214. An activity interceptor may be configured to transform a process activity by associating with that process activity the middleware service injection plug-in to which the interceptor belongs. Because plug-ins may be selected to match the extra-functional requirements and the context of the process activity, the effect of associating the activity interceptor with the process activity may be to install the middleware functionality matching the requirements and context. In an embodiment of the present invention, a middleware service injection plug-in may persist beyond the lifetime of a given process activity so as to be available for future process activities. In another embodiment of the present invention, an activity interceptor may apply to a group of process activities and/or a group of processes rather than to individual process activities.

In an embodiment of the present invention, the activity interceptor is self-contained. Thus, once associated with the process activity, it can transform that activity without further assistance from the middleware service injection plug-in. In another embodiment of the present invention, the activity interceptor serves as an interface between the process activity and the middleware service injection plug-in. For example, the activity interceptor may transmit all or a subset of the local message flow as input to the middleware services injection plug-in. It may then receive the output of the plug-in and may apply the output to the local message flow. Where the middleware functionality is provided by a middleware service, an activity interceptor may directly interface with the middleware service without using the middleware service injection plug-in as an intermediary.

An activity interceptor itself may be specific to one or more contexts of process activities. Thus, a middleware service injection plug-in may contain multiple activity interceptors, each suited for one or more possible contexts.

It is noted that the ability to modify an individual process activity implies the ability to modify a process as a whole. This is the case because modifying all the process activities in a process may be equivalent to modifying the process itself. Furthermore, an extra-functional requirement specified by the process as a whole is equivalent to the extra-functional requirement specified by each process activity individually. Likewise, a context element applying to the process as a whole is equivalent to the same context element applying to each process activity individually. It is also noted that an atomic process (e.g., one that is not divided into subparts or subtasks) may be considered as having one component process activity containing the entire logic and functionality of the process.

Figure 3:
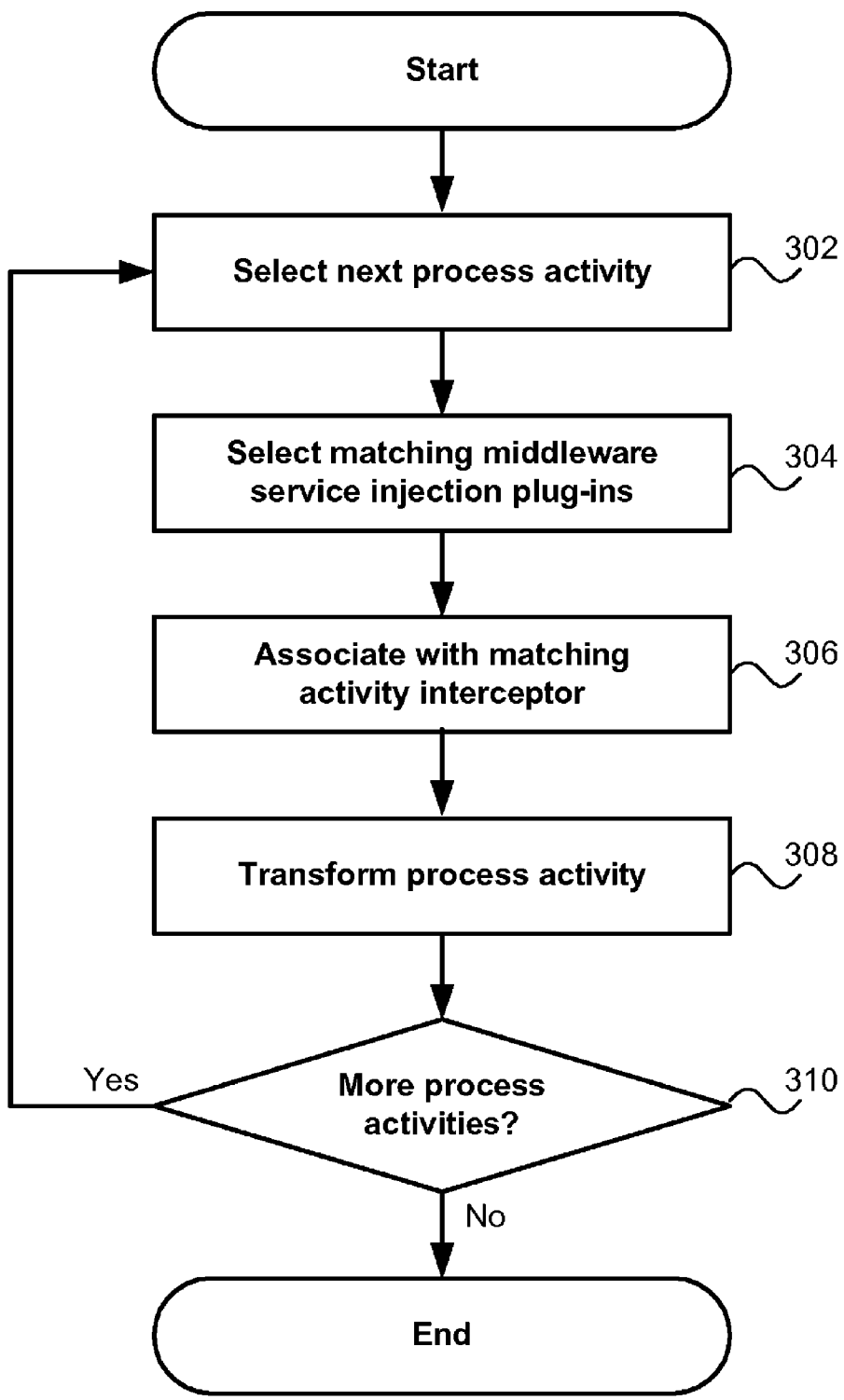
FIG. 3 illustrates an exemplary flowchart of the operations performed to transform a process via context-sensitive middleware service injection.

Turning now to FIG. 3, an exemplary flowchart of the operations performed to transform a process via context-sensitive middleware service injection is demonstrated.

At selecting operation 302, the middleware injection engine may select a process activity belonging to the process being modified. The method does not inherently require the process activities to be selected and transformed in any particular order. However, an embodiment of the present invention may consistently select the process activities in a specific order. The description of FIG. 4 below discusses a potential order and algorithm for selecting each process activity.

At selecting operation 304, the middleware injection engine may select middleware service injection plug-ins matching the extra-functional requirements and context of the selected process activity. As noted previously, the middleware injection engine may be aware of the extra-functional requirements and context of the process activity. It is noted that the extra-functional requirements may vary depending on the context of the process activity and of the interaction in which it is engaged. Context may include without limitation types of process activities, phases of execution of process activities, identities of interaction partners, system architectures and the status of a given interaction. The middleware injection engine may query a repository of available middleware service injection plug-ins to determine zero or more plug-ins matching the extra-functional requirements and context. Middleware service injection plug-ins matching these criteria generally provide the desired middleware functionality, as middleware functionality generally exists to meet extra-functional requirements. In an embodiment of the present invention, the ability to specify that a specific process activity shall be modified by a specific middleware service injection plug-in is also provided.

At associating operation 306, the middleware injection engine and/or the selected middleware service injection plug-in may select one or more activity interceptors matching the context of the selected process activity. This association may involve interpolation of the activity interceptor into the message flow. In an embodiment of the present invention, the activity interceptor is interpolated into the message flow both before and after the process activity. As a result, the activity interceptor can effect the modification of both sent and received messages.

At transforming operation 308, the activity interceptor may transform the selected process activity by associating with it the middleware service injection plug-in to which the interceptor belongs. It is noted that the selected middleware service injection plug-in generally provides the desired middleware functionality matching the context and extra-functional requirements of the process activity.

At determining operation 310, the middleware injection engine may determine whether any of the process activities in the process have not yet been transformed. If any process activities remain, control may return to selecting operation 302 so as to transform the remaining process activities.

If no process activities remain, the transformation of the process via context-sensitive middleware service injection is complete. However, it is contemplated that the operations listed above may be repeated on a frequent basis. Doing so may be beneficial because in many processes, the set of active process activities, the context and even the extra-functional requirements may change over time.

Figure 4:
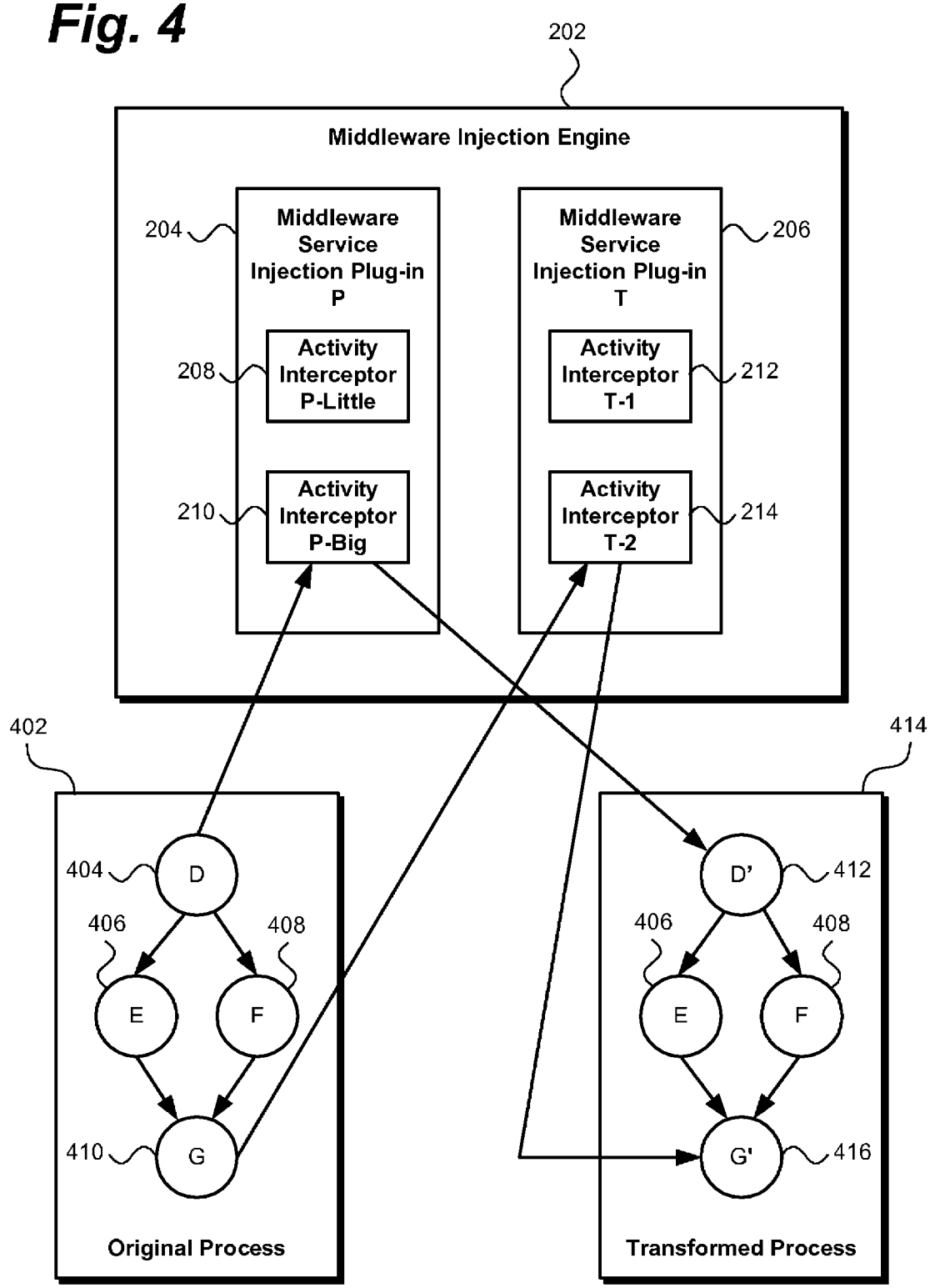
FIG. 4 illustrates the process by which the middleware injection engine and its components analyze and transform a process.

Turning now to FIG. 4, the process by which the middleware injection engine and its components analyze and transform a process is demonstrated. The elements of FIG. 2 are repeated herein as an aid to understanding this process. Nonetheless, it is emphasized that the following discussion primarily concerns the process in its original and transformed versions.

As previously noted, a process is subdivided into zero or more process activities. The exemplary process 402 includes process activities D 404, E 406, F 408 and G 410. In an embodiment of the present invention, the process activities belonging to a process can be expressed using a graph or tree structure. Such a structure may express the relationships between the process activities. It may further express temporal relationships between process activities, such that one process activity commences upon the completion of another process activity. It is noted that not all process activities need be represented within a continuous graph or tree. For example, if two sets of process activities execute in parallel, they may be represented by two separate tree structures. The exemplary process begins execution with process activity D. When process activity D is complete, process activities E and F execute in parallel. Once both E and F have concluded, process activity G is executed.

The process and its process activities may be coded using any of a wide variety of programming languages and constructs known in the art. These programming languages may be compiled and may be interpreted. In an embodiment of the present invention, the process and its process activities are coded in Business Process Execution Language (BPEL). BPEL is a programming language designed to facilitate the formal specification of business processes and interaction protocols.

Each process activity may express zero or more extra-functional requirements. In an embodiment of the present invention, extra-functional requirements are expressed using WS-Policy, an XML-based grammar designed to facilitate the expression of policies by web services.

The middleware injection engine 202 may analyze the program code of the process and its process activities to determine how to transform the process via context-sensitive middleware service injection. To perform this analysis, it may traverse a tree or graph data structure representing the process activities. It is noted that numerous algorithms known in the art for efficient traversal and processing of tree and graph data structures may be used by the middleware injection engine 202. The middleware injection engine 202 may further analyze the extra-functional requirements and context of each process activity and/or the original process. Dynamic selection of middleware functionality based on such an analysis is beneficial because it allows processes not known at the time of system configuration to be modified by middleware injection. Furthermore, it allows adapting the specific middleware to be injected based on real-time changes in context and extra-functional requirements.

In the exemplary process, process activity D 404 imposes an extra-functional requirement of authentication using a public-key encryption protocol "P". Process activities E 406 and F 408 do not impose any extra-functional requirements. Process activity G 410 imposes an extra-functional requirement that any of several guaranteed message delivery protocols must be followed when sending a message to the interaction partner. Furthermore, available context information includes the fact that the computing system executing the process uses big-endian architecture and the interaction partner only accepts guaranteed message delivery protocol "T".

Traversing the exemplary graph, the middleware injection engine 202 may begin with process activity D 404. The extra-functional requirement is authentication using a public-key encryption protocol "P". Furthermore, the context information that the architecture is big-endian is relevant. This is because while the protocol itself specifies that the messages shall be transmitted in little-endian form, the messages are converted to big-endian form for internal convenience of the underlying architecture. Big-endian form means data is expressed with higher-ordered bytes before lower-ordered bytes, while little-endian form is the exact opposite. Microprocessors internally utilize either big-endian or little-endian form; it is often beneficial to represent data using the form used by the microprocessor.

The middleware injection engine may thus query for a middleware service injection plug-in matching the extra-functional requirement and the context. In the exemplary system, the middleware service injection plug-in P 204 is the only plug-in providing the functionality for the public-key encryption protocol "P". Furthermore, plug-in P is applicable to any context. Thus, the middleware injection engine selects plug-in P.

The middleware service injection plug-in P 204 has two different activity interceptors. The first, activity interceptor P-Little 208, is designed to transform processes on little-endian architectures. The second, activity interceptor P-Big 210, is designed to transform processes on big-endian architectures. It includes the additional step of converting between little-endian order for exchanged messages and big-endian order for local processing. Based on the context information of big-endian architecture, the middleware injection engine 202 and/or the middleware service injection plug-in P selects the activity interceptor P-Big, associating it with process activity D 404. The association transforms process activity D into process activity D' 412 in the transformed process 414.

Having completed the processing of process activity D 404, the middleware injection engine 202 may continue traversing the graph of process 402. The next process activities to be considered are E 406 and F 408. Neither process activity imposes any requirements on interaction. The middleware injection engine deems it unnecessary to transform either process activity using the method of the present invention. Thus, the transformed process 414 includes process activities E and F in their original form.

Continuing to traverse the graph of original process 402, the middleware injection engine 202 may continue to process activity G 410. The extra-functional requirement is the usage of a guaranteed message delivery protocols when sending a message to the interaction partner. Furthermore, the context information that the interaction partner accepts only the protocol "T" for guaranteed message delivery is clearly relevant.

The middleware injection engine may thus query for a middleware service injection plug-in matching the extra-functional requirement and the context. In the exemplary system, several middleware service injection plug-ins provide guaranteed message delivery functionality. However, only middleware service injection plug-in T 206 provides the specific protocol "T". The middleware injection engine 202 may thus select plug-in T because it matches both the requirement of guaranteed message delivery generally and the context information that protocol "T" specifically is required.

The middleware service injection plug-in T 206 has two different activity interceptors. Based on the context information, the middleware injection engine 202 and/or the middleware service injection plug-in T selects the activity interceptor T-2 214, associating it with process activity G 410. The association transforms process activity G into process activity G' 416 in the transformed process 414.

Attempting to traverse the graph further, the middleware service engine 202 determines that no further process activities exist in the original process 402. The original process has thus been completely transformed into the transformed process 414.

Figure 5:
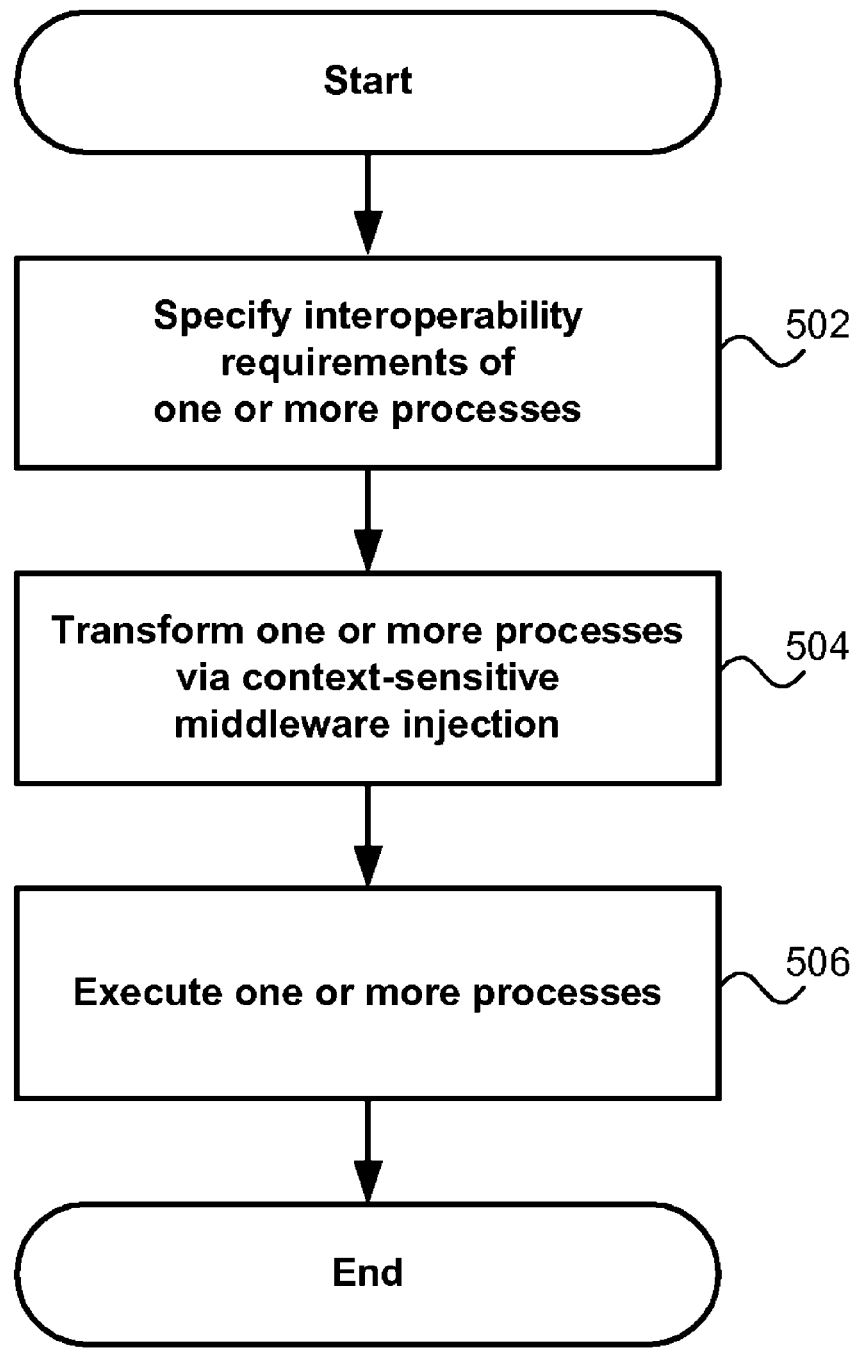
FIG. 5 shows an exemplary flowchart of operations performed to develop systems that can be transformed via context-sensitive middleware service injection.

In FIG. 5, an exemplary flowchart of operations performed to develop systems which can be transformed via context-sensitive middleware service injection is shown.

Specifying operation 502 may occur during the application development process. Application design may include the design and/or programming of one or more processes and their process activities. During the development process, zero or more extra-functional requirements may be specified for each process activity. In an embodiment of the present invention, the extra-functional requirements themselves may depend on context information. For example, a specification may exist that 256-bit encryption, an extra-functional requirement, is mandatory if the interaction partner, a context element, is not a member of a set of trusted interaction partners.

Transforming operation 504 may apply the operations shown in FIGS. 3 and 4 to the one or more processes developed in specifying operation 502. Thus, middleware functionality may be injected into the developed processes based on the specified extra-functional requirements and/or any context information.

Executing operation 506 may execute the processes designed in specifying operation 502 and transformed by transforming operation 504. The execution may thus include the middleware functionality injected into the process in order to meet the extra-functional requirements given the context information.

In an embodiment of the present invention, transforming operation 504 may be repeated during executing operation 506. This behavior beneficially allows middleware to be injected according to extra-functional requirements and/or context elements which are not known prior to the beginning of executing operation 506.

It should be noted that the method of the present invention may be embodied in a program product, which includes all features for implementing the method of the present invention and can implement the method when it is loaded in a machine system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for context-sensitive middleware service injection by a computer processor, the method comprising:
    selecting middleware service injection plug-ins matching a context of at least one process activities;
    associating with each of the at least one process activities an activity interceptor matching the context of the process activity; and
    transforming by the computer processor each of the at least one process activities by executing the activity interceptor to associate with each process activity the middleware service injection plug-in matching the context, the plug-in effecting a desired functionality;
    wherein the middleware service injection plug-ins, when executed by the computer processor, effect the desired functionality by invoking a middleware service;
    wherein the invocation of the middleware service is effected via a remote Internet call;
    wherein the middleware service injection plug-ins are selected to implement predefined extra-functional requirements; and
    wherein the middleware service injection plug-ins, when executed by the computer processor, provide authentication and encryption functionality.

2. The method of claim 1, wherein the context of the at least one process activities includes at least one chosen from the group of extra-functional requirements, process activity types, phases of execution of process activities, interaction partners, system architectures, and status of a given interaction.

3. The method of claim 1, wherein the middleware service injection plug-ins, when executed by the computer processor, provide guaranteed message delivery functionality.

4. The method of claim 1, wherein the middleware service injection plug-ins, when executed by the computer processor, provide transactionality.

5. A system for context-sensitive middleware service injection, the system comprising:
    computer readable memory;
    a computer processor coupled to the computer readable memory, the computer processor configured to select middleware service injection plug-ins matching a context of at least one process activities, associate with each of the at least one activities an activity interceptor matching the context of the process activity, and transform each of the at least one process activities by executing the activity interceptor to associate with each process activity the middleware service injection plug-in matching the context; and
    wherein each middleware service injection plug-in is configured to effect a desired functionality
    wherein the middleware service injection plug-ins are configured to effect the desired functionality by invoking a middleware service;
    wherein the computer processor, in selecting middleware service injection plug-ins matching a context of at least one process activities, is configured to select middleware service injection plug-ins implementing predefined extra-functional requirements;
    wherein the middleware service injection plug-ins are configured to provide authentication and encryption functionality; and
    wherein the invocation of the middleware service is effected via a remote Internet call.

6. The system of claim 5, wherein the middleware service injection plug-ins are configured to provide guaranteed message delivery functionality.

7. The system of claim 5, wherein the middleware service injection plug-ins are configured to provide transactionality.

8. A computer program product for context-sensitive middleware service injection by a computer processor, the computer program product comprising:
    a computer readable tangible storage medium having computer readable program code embodied therewith, the computer readable program code configured to:
        select middleware service injection plug-ins matching a context of at least one process activities;

associate with each of the at least one process activities an activity interceptor matching the context of the process activity; and transform each of the at least one process activities by executing the activity interceptor to associate with each process activity the middleware service injection plug-in matching the context, the plug-in effecting a desired functionality;

wherein the middleware service injection plug-ins are configured to effect the desired functionality by invoking a middleware service;

wherein the computer readable program code to select middleware service injection plug-ins matching a context of at least one process activities includes computer readable program code to select middleware service injection plug-ins to implement predefined extra-functional requirements wherein the middleware service injection plug-ins are configured to provide authentication and encryption functionality; and wherein the invocation of the middleware service is effected via a remote Internet call.

9. The computer program product of claim 8, further configured to define the context of the at least one process activities as at least one chosen from the group of extra-functional requirements, process activity types, phases of execution of process activities, interaction partners, system architectures, and status of a given interaction.

* * * * *